Nov. 12, 1940.   FRIEDRICH-WILHELM KAHLE   2,221,066
PROCESS FOR THE RECOVERY OF THE SULPHUROUS ACID PRODUCED
IN THE SULPHITE CELLULOSE COOKING PROCESS
Filed Feb. 3, 1938
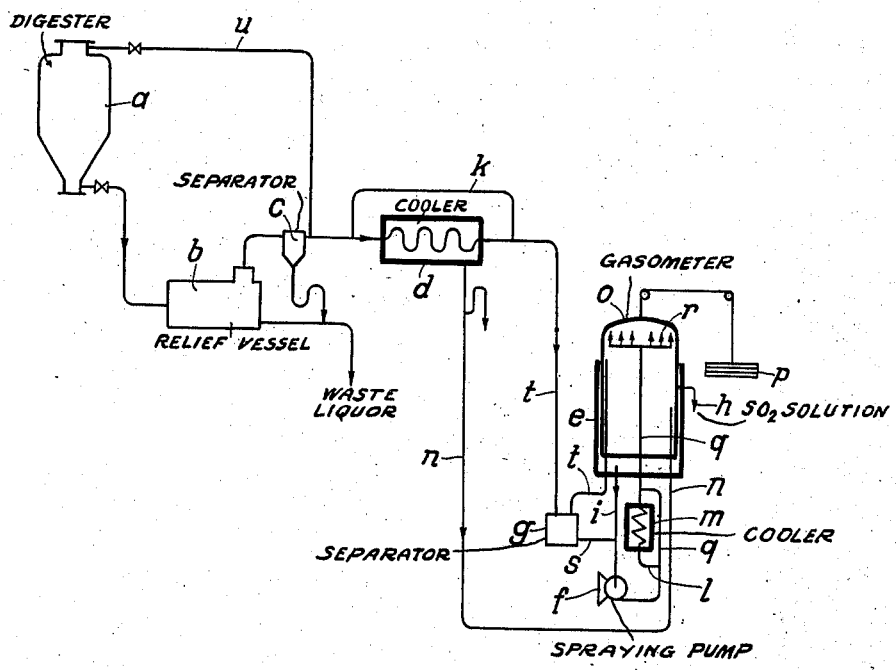
Inventor:
Friedrich-Wilhelm Kahle
By Watson, Cole, Morse & Grindle
Attorneys.

Patented Nov. 12, 1940

2,221,066

UNITED STATES PATENT OFFICE 2,221,066

PROCESS FOR THE RECOVERY OF THE SULPHUROUS ACID PRODUCED IN THE SULPHITE CELLULOSE COOKING PROCESS

Friedrich-Wilhelm Kahle, Mannheim-Waldhof, Germany, assignor to Zellstofffabrik Waldhof, Mannheim-Waldhof, Germany, a joint-stock company of Germany Application February 3, 1938, Serial No. 188,588
In Germany March 9, 1937

5 Claims. (Cl. 23—178)

In the processes known heretofore for the recovery of the sulphurous acid which is liberated from the spent liquor produced in the cooking process, it is not possible to render the entire quantity of $SO_2$ completely available again. This is mainly due to the fact that the spent liquor, which is only produced intermittently, liberates a comparatively large quantity of sulphurous acid during the first few minutes abruptly in a short time. The known devices have been unable to withstand this abrupt load owing to the restricted possibilities they afforded in regard to dimensions, so that a more or less considerable proportion of the sulphurous acid escaped into the open. This signified not only a private and national economic loss, but also sometimes a considerable annoyance on account of the odour, and in some cases considerable damage to the surroundings.

It has now been found that these disadvantages may be obviated and at the same time the sulphurous acid liberated from the spent liquor, including the quantities produced abruptly, may be entirely recovered and a sulphurous acid solution of any desired concentration may be obtained if the gases and vapours liberated in a relief vessel from the spent liquor derived from one or more digesters, are supplied in a closed system, if desired with the interposition of a spent liquor separator, to an absorption device of gas holder construction, the bell of which is balanced so that it responds as rapidly as possible to a sudden increase in the quantity of gas supplied.

In the absorption device of gas holder construction, solution of the $SO_2$ gas in the sealing liquid takes place. It is possible to operate in a continuous process, for example by continuously supplying fresh liquid as the sealing liquid, which is concentrated in $SO_2$, flows away from the absorption vessel of gas holder construction. It is also possible, of course, to operate intermittently. Water or even a liquid already possessing a certain $SO_2$ content, such as for example tower liquor, may be employed as sealing liquid.

In some cases it may be expedient for the gases and vapours coming from the relief vessel to be cooled, for example in a pipe cooler of the usual type or in a cold water injection cooler, before admitting them to the absorption device of gas holder construction. The degree of cooling may vary. If cooling is effected to a low degree, the condensate still possesses a corresponding $SO_2$ content, so that if desired the aqueous fraction may also be employed as sealing liquid in the absorption device of gas holder construction. The rates of flow may also be so regulated that the quantity of condensate supplied is equal to the quantity of $SO_2$—containing liquid produced at the discharge of the absorption device of gas holder construction.

By suitable regulation of the temperature of the cooling medium, it is however also possible to keep the condensate practically free from $SO_2$ and to collect the total quantity of sulphurous acid in the form of gas in the absorption device of gas holder construction, without any increase in the liquid.

In order to secure a particularly intensive solution of the $SO_2$ gas in the gas holder liquid, it is preferable to withdraw sealing liquid continuously or only intermittently from the lower part of the absorption device of gas holder construction by means of a liquid raising device, for example a pump, and, if desired after cooling in a cooler incorporated in the circulating pipe-line, to spray it into the gas space of the absorption device of gas holder construction, spraying being effected by means of one or more nozzles, according to the size of the absorption device of gas holder construction. In order also to recover the $SO_2$ fractions contained in any liquid condensed in the pipe-line leading to the absorption device of gas holder construction, or in a separator connected in front of the absorption device of gas holder construction, it is possible during the circulation of the sealing liquid to draw this liquid continuously or intermittently from the pipe-line or from the separator.

Circulation may be effected in the case of either continuous or intermittent supply of sealing liquid.

It may likewise be expedient for the sealing liquid, supplied in one or the other way, to be sprayed entirely or partly into the gas space the first time it is supplied to the absorption device of gas holder construction.

Circulation is preferably regulated automatically, for example by automatically putting into operation the liquid-raising device in the case of a certain adjustable position of the gas holder bell and putting it out of operation in the case of another adjustable position of the bell.

By working in a closed system according to the invention, it is possible, with the production of sulphurous acid solutions of any desired concentration, such as cooking liquors, tower liquor and the like of different strengths, to secure a complete recovery of the sulphurous acid liberated from the spent liquor in the relief vessel, including also the considerable quantities of $SO_2$ produced abruptly in the first few minutes after the liquor has left the digester. Since the gas holder bell responds immediately to an increase in volume and also since the gas dissolves rapidly in the sealing liquid, satisfactory conduct of the operation, which is a necessary condition for the complete removal of all the quantities of $SO_2$, is ensured.

By the new process, it is possible to recover not only the $SO_2$ gas liberated in relieving the spent liquor outside the digester, but also in the same way the $SO_2$ gas released in the digester itself from the liquor situated therein during and after the washing out or rinsing operation.

Heretofore, during the washing out of the digester, the $SO_2$ vapours liberated, during and after drainage, from the hot liquor still in the digester after the cessation of the release of the gas, have been condensed by spraying water into the digester. This however, implies a not inconsiderable loss of $SO_2$, because the spent liquor now leaving the digester can no longer be relieved and hence also cannot give off any more sulphurous acid. A substantial portion of the $SO_2$ thus remains in the spent liquor and passes with the latter to the spirit factory, where increased expenditure and trouble is required in order to eliminate the resulting increase in the acid degree, which represents an unpleasant burden in the subsequent treatment of the spent liquor.

Exhaustive experiments have shown that it is possible to obviate these disadvantages and to ensure a considerably increased recovery of $SO_2$, while at the same time obviating trouble in the spirit factory, if, in addition to the $SO_2$ produced by relieving the spent liquor outside the cooker, for example in a relief vessel, the sulphur dioxide gas liberated by the relief of the hot liquor still in the digester during and after the washing out operation, is also supplied to the gas holder serving as absorption vessel and is there dissolved in the sealing liquid to any desired concentration.

A construction of the invention is shown by way of example in the single figure of the accompanying drawing.

The spent liquor of the digester $a$ is passed through a relief vessel $b$ in which it gives off steam and $SO_2$. The relief gases pass through a liquor separator $c$, the discharge of which again opens into the spent liquor pipe-line, but behind the relief vessel. After the liquor separator is a cooler $d$ whereby the steam is condensed, some of the $SO_2$ being simultaneously dissolved by the condensate, according to the temperature of the cooling medium. The cooled gases are supplied through the pipe-line $t$ via a separator $g$ to an absorption device $e$ of gas holder construction. A by-pass $k$ is provided, which enables the cooler $d$ to be put out of operation. The condensate discharge pipe-line $n$ of the cooler likewise terminates in the absorption device $e$ of gas holder construction. It is thus impossible for any gas which gets through or any $SO_2$ dissolved in the condensate to be lost. The bell $o$ of the absorption device $e$ of gas holder construction is balanced by the counter-weight $p$, so that the entire system is free from pressure and hence the spent liquor can be relieved entirely.

By means of a pump $f$, sealing liquid is withdrawn by means of pipe $i$ from the bottom of the absorption device of gas holder construction, and is re-introduced through the pipe-line $q$ into the absorption device of gas holder construction, being sprayed by means of one or two spraying nozzles $r$ against the top of the bell, whilst at the same time, any condensate collected in the gas conduit may also be removed by the pump from the separator $g$ through the conduit $s$. Due to the spraying of the sealing liquid, the $SO_2$ is readily and completely absorbed, particularly that produced in peak quantities in the first few minutes of the relief of the spent liquor. Incorporated in a by-pass $l$ in the pressure line of the pump is a cooler $m$ for cooling the sealing liquid if necessary. The cooler $m$ may be put into operation more particularly whenever the gases and vapours are passed directly to the absorption device $e$ of gas holder construction through the by-pass $k$, cutting out the cooler $d$.

The liquid obtained, which contains $SO_2$ and the concentration of which may be varied by suitable regulation of the rate of passage and circulation, is discharged at the overflow $h$.

After the cessation of the evolution of gas, which extends into the commencement of the washing out period, the vapours are discharged from the upper part of the digester $a$ and are led off by the pipe-line $u$ and enter the pipe-line leading to the absorption device of gas holder construction at a point behind the separator $e$ following the relief vessel $b$, by which path they are then led into the gas holder $e$ serving as absorption vessel, expediently together with the quantities of $SO_2$ liberated in the relief vessel $b$. They are there dissolved in the sealing liquid and are employed further as cooking liquor, tower liquor and so forth.

I claim:

1. Process for the complete recovery of the sulphurous acid from the spent liquor produced in the sulphite cellulose cooking process, comprising collecting in a vessel of variable volume, at a low, substantially constant pressure, the whole of the sulphur dioxide evolved from the spent liquor upon the discharge of the latter from the digester, and spraying a liquid into said vessel, thereby dissolving the collected sulphur dioxide in said liquid.

2. Process for the complete recovery of the sulphurous acid from the spent liquor produced in the sulphite cellulose cooking process, comprising separating the sulphur dioxide gas from the spent liquor upon the discharge of the latter from the digester, collecting the whole of said gas, together with the sulphur dioxide gas given off in the digester during said discharge, in a vessel of variable volume, at a low, substantially constant pressure, and spraying a liquid into said vessel, thereby dissolving the collected sulphur dioxide in said liquid.

3. The process defined in claim 1, including the step of cooling the sulphur dioxide gas before it is collected.

4. The process defined in claim 1, said liquid being repeatedly sprayed into said vessel.

5. The process defined in claim 1, a part of the liquid sprayed into the vessel being continuously withdrawn and the remainder of said liquid, together with fresh liquid, being again sprayed into said vessel.

FRIEDRICH-WILHELM KAHLE.